Jan. 6, 1970     S. G. WOLF     3,487,953

SLAB TURNER

Original Filed Feb. 14, 1967     2 Sheets—Sheet 1

INVENTOR.
SIEGFRIED G. WOLF

BY *Meyer, Tilberry & Body*

ATTORNEYS

Jan. 6, 1970 S. G. WOLF 3,487,953
SLAB TURNER

Original Filed Feb. 14, 1967 2 Sheets-Sheet 2

INVENTOR.
SIEGFRIED G. WOLF

BY *Meyer, Tilberry & Body*

ATTORNEYS

United States Patent Office 3,487,953
Patented Jan. 6, 1970

3,487,953
SLAB TURNER
Siegfried Gerhard Wolf, Salem, Ohio, assignor to
E. W. Bliss Company, Canton, Ohio, a corporation of Delaware
Continuation of abandoned application Ser. No. 616,113, Feb. 14, 1967. This application Dec. 6, 1968, Ser. No. 788,675
Int. Cl. B65g 47/00; B21b 39/32
U.S. Cl. 214—1                                       8 Claims

ABSTRACT OF THE DISCLOSURE

This disclosure pertains to a material handling device for extremely heavy objects such as continuously cast steel slabs or the like. The device is constructed in the form of a rack of substantially the same length as the longest slab to be cast. The rack is composed of cooperating manipulators including pivoted, longitudinally spaced slab positioning arms which are initially horizontally interleaved and upon which the slab is positioned. The arms pivot independently about parallel axes through a system of levers and hydraulic cylinders so as to turn and transport the slab below a predetermined work plane successively while presenting a different side of the slab at the conclusion of each turning motion in the work plane.

---

This application is a continuation of application Ser. No. 616,113, filed Feb. 14, 1967, now abandoned.

The invention relates in particular to the art of material handling devices utilized in conjunction with automatic machinery such as a billet or slab grinder of the type disclosed in U.S. patent application S.N. 428,375 filed Jan. 27, 1965, now Patent No. 3,353,305, entitled "Tilted Spindle Grinder" and assigned to the assignee of this invention. In an automatic grinder it is necessary to turn the slab after successive passes of the grinding wheel have finished one side. Thus while the present invention will be described with reference to a device for turning extremely heavy metal slabs where all four sides are to be presented for grinding in a fixed fork plane, it will be appreciated that it has broader aspects and may be used as well in handling billets, bars, rods, squares or stacking of sheet material.

It will also be appreciated that the invention is applicable to other purposes aside from grinding, such as banding sheet metal bundles or the like.

Cast metal slabs are usually moved about in the casting plant by means of overhead cranes. While a slab may be picked up, moved a considerable distance to another location and then lowered with a minimum of time by means of a crane, experience has shown that turning such an object in one place is an entirely different matter. For instance, an automatic grinder is not economically operated when serviced by a crane since it is inactive while the crane is being rigged for turning the slab to the next position. Moreover, present day continuous casting machines routinely cast slabs 60″ wide by 8″ thick, which, when cut in 30′ lengths, may exceed the lifting capacity of conventional overhead cranes.

Nor do known prior art overturning devices, such as rocking tables or the like, prove entirely satisfactory in an application requiring that a slab be turned, clamped in position, and then turned again with all movements carried out below a predetermined work plane.

Accordingly, the invention provides a device for positioning a generally flat object having two generally orthogonal dimensions in a work plane comprising two positioning arms pivoted about generally parallel axes and spaced from each other in a direction corresponding to the first of the dimensions and extending generally along the second of the dimensions, each of the axes being supported on a lever-like element and means for pivoting the lever-like elements about separate axes, each of which is associated with and generally parallel one of the axes of said positioning arms.

Further in accordance with the invention, the positioning arms are manipulated by the lever-like elements to clamp the object in each successive position.

Further in accordance with the invention, the object is supported on one arm in moving from the horizontal to a vertical position, the lever-like elements being manipulated to tilt the object past its center of gravity in the vertical position and onto the other arm, which latter arm supports the object during its return to the horizontal position.

The main object of the invention is to provide a workpiece device which will position, clamp and reposition a workpiece so as to present each successive side in a work plane.

A further object is to provide a material handling device capable of accomplishing a 360° turn of a workpiece without raising it above a given plane.

Still another object is to provide a material handling device for turning extremely heavy objects, such as cast slabs, which will alternately clamp and rotate the slab in association with an automatic tool for performing work theron.

For the purpose of illustration, the accompanying drawings shown herein describe one form of apparatus embodying the invention wherein FIGURE 1 is a partial perspective view of a slab turner shown in the position to receive a slab;

Figure 1:
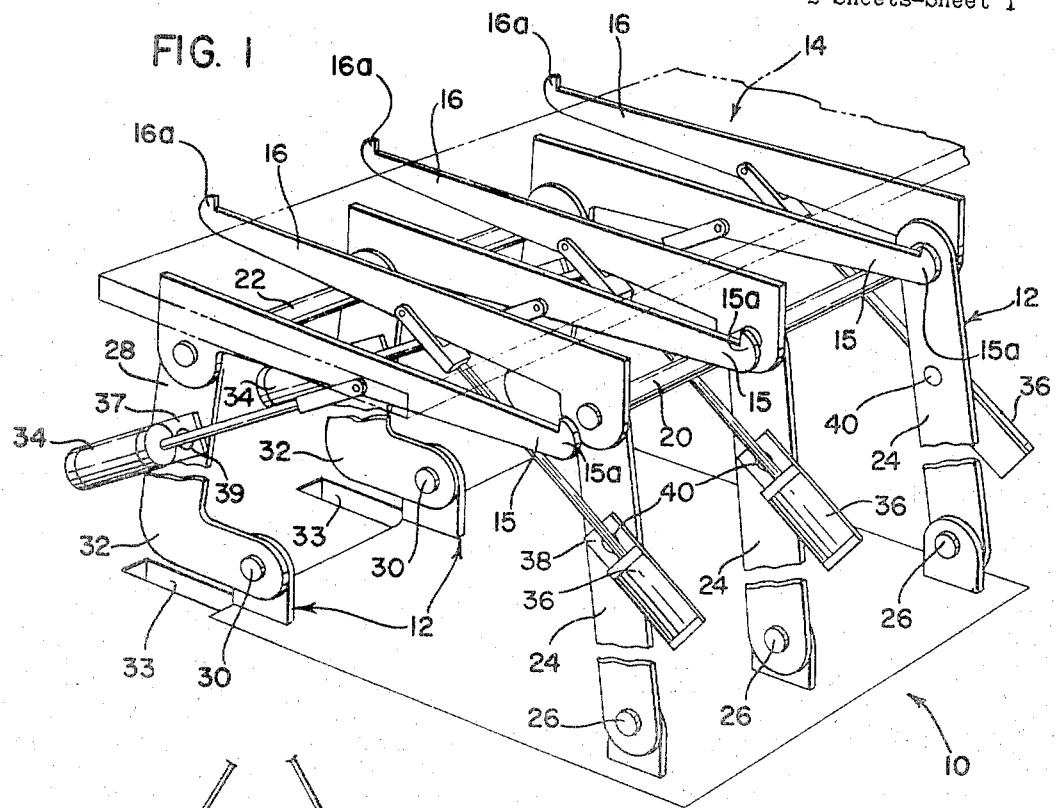

Referring now to the drawings wherein the showings are for the purpose for illustrating a preferred embodiment of the invention rather than for any purpose of limiting the same, in FIGURE 1 a slab turner 1 is shown composed of a series of manipulating units 12 only 3 of which are shown in FIGURE 1; however, it will be understood that the slab 14 shown in dot-dash lines in FIGURE 1 may be in excess of 30 feet, in which case the slab turner 10 would be provided with sufficient units 12 to accommodate that length. Each unit 12 is identical and functions in unison with the rest. Thus, hereinafter the description will be with reference to one of the manipulating units 12 although it will be appreciated as applying equally to the others.

Each manipulating unit 12 is composed of a pair of slab positioning arms 15, 16 which extend parallel to each other transversely to the longitudinal axis of the slab 14. The upper surfaces of arms 15, 16 are level, establishing a work pane. Slab positioning arms 16 of each manipulating unit 12 are mutually pivoted on a trunnion 20 extending parallel to the longitudinal axis of the slab 14 on one side, while slab positioning arms 15 are mutually pivoted on trunnion 22 extending parallel to the longitudinal axis of the slab on the opposite side. The trunnion 20, supporting each slab positioning arm 16, is journaled at the upper end of a plurality of clamping link arms 24, each of which is pivoted at 26 adjacent the bottom while the trunnion 22, supporting the slab positioning arms 15 on the opposite side, is journaled on a plurality of angle brackets 28 each of which is pivoted at 30 includes an elbow portion 32 which must have a certain freedom of movement below the plane of pivots 26, 30 as represented by recessses 33. Obviously the arrangement could be to elevate pivots 26, 30 thereby eliminating recesses 33. Slab positioning arms 15, 16 are operated by pairs of hydraulic cylinders 34, 36 mounted on brackets 37, 38 each pivoted at 39, 40 to the angle bracket 28 and clamping link arm 24 respectively. Hydraulic cylinder units 42, 44 (FIGURE 4) operate the angle brackets 28 and clamping link arms 24 in a manner described hereinafter. Obviously, since the manipulating units 12 are operated in unison, a total of four hydraulic cylinders, or any multiple thereof depending on the load considerations, may be connected in such a manner as to drive the manipulating units 12 instead of having sets of four cylinders for each unit as shown.

Figure 2:
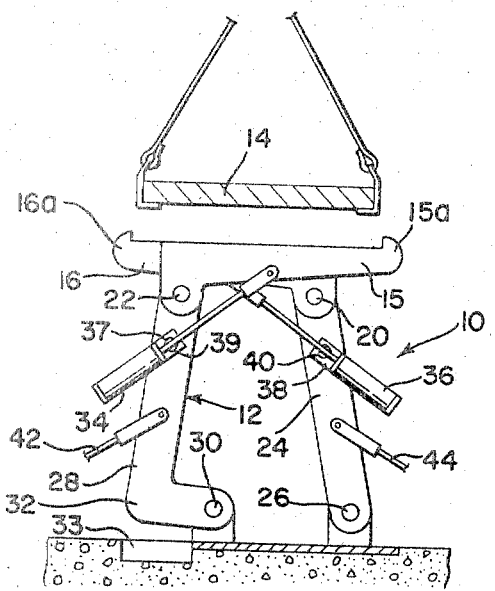
FIGURES 2 and 3 are end views of the slab turner in FIGURE 1 showing a slab being positioned thereon.
Figure 3:
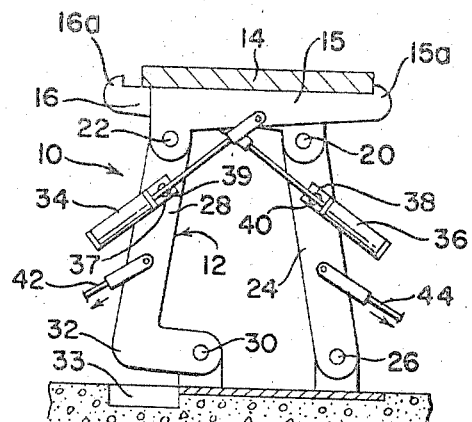

For reference purposes, the four sides of the slab 14 which are to be finished will be letterd *a, b, c. d*, consecutively in the order in which they are presented in the work plane. Referring now to FIGURES 2 and 3, the slab 14 is shown being lowered onto the slab turner 10, which as mentioned previously, is employed in conjunction with an automatic machine such as a grinder (not shown). Initially, the cylinder units 42, 44 have positioned the slide positioning arms 15, 16 to provide a gap between hooked ends 16a, 15a sufficiently wide to accommodate the width of the slab 14.

Figure 4:
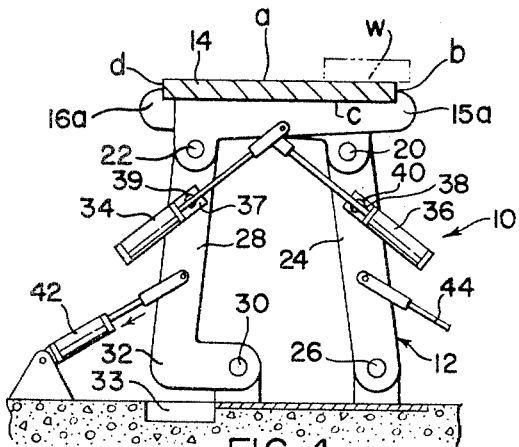
FIGURE 4 is an end view similar to FIGURE 3 showing the slab being clamped at a horizontal position for grinding the top side.

After positioning the slab, the angle bracket 28 and clamping link arm 24 are pivoted outwardly about pivots 30, 26 by the cylinder units 42, 44 which clamps the slab between the hooked ends 15a, 16a of the slab positioning arms 15, 16 so that side *a* is presented in the work plane of grinding wheel *w* (FIGURE 4). The automatic grinder will have a carriage which traverses the slab 14 in the direction parallel to its longitudinal axis so that with each pass of the carriage, the grinding wheel *w* is indexed over from right to left until the entire surface is ground.

Figure 5:
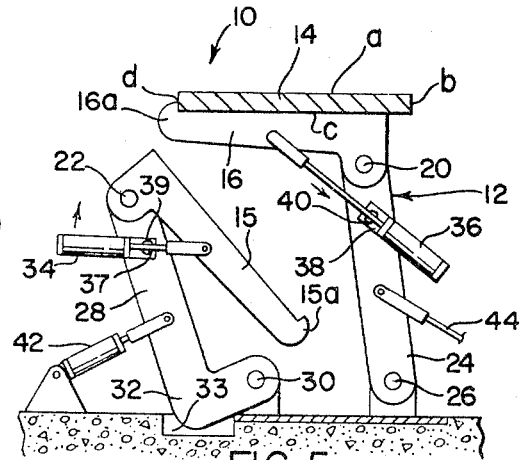
FIGURE 5 shows the step of releasing the slab in preparation for moving it to a vertical position.

Thereafter, the surface *a* having been finished, the slab 14 is released by moving clamping link arm 24 and angle bracket 28 inwardly. As shown in FIGURE 5, the slab positioning arm 15 is then pivoted downwardly and the angle bracket 28 is tilted rearwardly, while slab positioning arm 16 continues to support the slab in the horizontal position.

Figure 6:
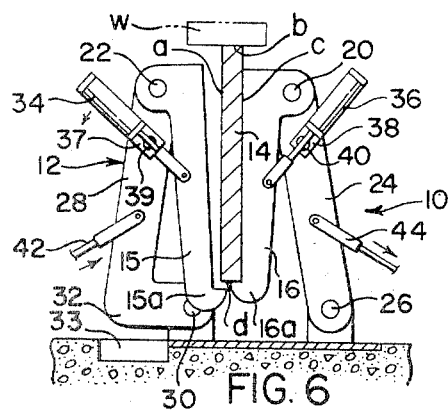
FIGURE 6 shows the slab to be clamped in the vertical position for grinding one edge.

With slab positioning arm 15 and the angle bracket 28 tilted out of the way as shown in FIGURE 5, the slab positioning arm 16 is pivoted to the vertical position bringing side *b* of the slab into the work plane (FIGURE 6). The slab is clamped in the vertical position when slab positioning arm 15 is moved into engagement with side *a* by pivoting angle bracket 28 inwardly and upwardly about pivot 30. The grinding wheel *w* contacts side *b* while the slab is supported on side *d* from hooked ends 15a, 16a of the slab positioning arms 15, 16.

After grinding side *b* angle bracket 28 is rotated about pivot 30 rearwardly while at the same time, slab positioning arm 16 and clamping link arm 24 are manipulated so as to tilt the slab past its center of gravity causing it to tip over onto slab positioning arm 15.

Figure 7:
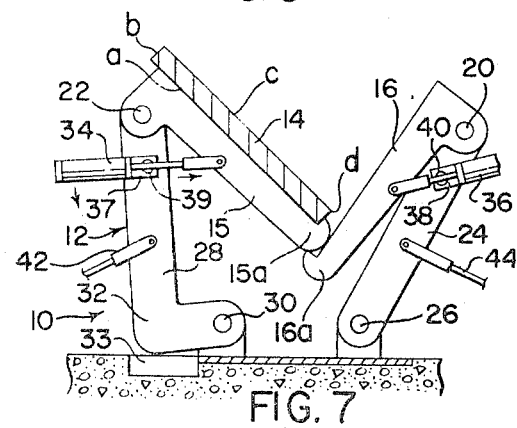
FIGURE 7 shows the manipulation of the slab positioning arms for returning the slabs to the horizontal for grinding the opposite side.
Figure 8:
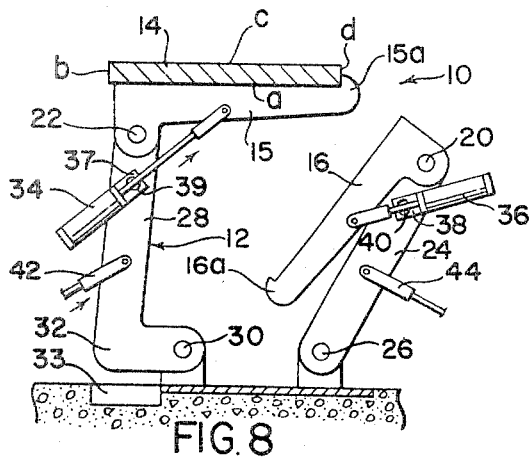
FIGURE 8 shows the slab in the horizontal position again for grinding the opposite side.
Figure 9:
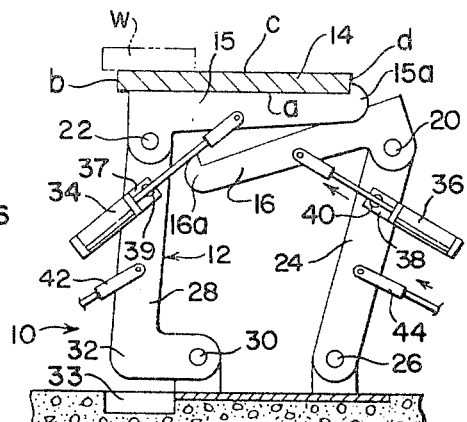
FIGURE 9 shows movement of the one slab positioning arm back to a horizontal supporting position; the forth side of the slab is ground by repeating the sequences of FIGURES 5 and 6 returning it to the vertical position.

Referring now to FIGURE 7, clamping link arm 24 and slab positioning arm 16 are now rotated rearwardly about pivot 26 so as to be out of the way while slab positioning arm 15 pivots upwardly on trunnions 22 from a vertical to the horizontal position (FIGURE 8). Clamping link arm 24 is then pivoted forwardly about the pivot 26 while the slab positioning arm 16 is raised beneath side *a* of the slab. The side *c* is then clamped in the work plane in the same position previously occupied by side *a*.

The slab is returned to the vertical position for grinding the remaining side *d* which is positioned in the work plane repeatng the steps illustrated in FIGURES 5 and 6.

It is important to note that, in accordance with the invention, the slab is turned without being raised substantially above the work plane so as not to interfere with the automatic equipment, nor does any part or parts of the slab turner 10, such as slab positioning arms 15, 16, rise above the work plane to create a possible interference. Moreover, the slab 14 is returned each time to the horizontal and vertical position such that the upper right hand corner, or other location desired, is always in the exact same position. This is to assure that initiating electrical circuits for the automatic equipment are triggered which will cause operation at the proper time.

Having thus described a preferred embodiment of the invention it will be appreciated that other forms may be envisioned by those skilled in the art without necessarily parting from the invention as defined in the appended claims.

What is claimed is:

1. Apparatus for positioning a generally flat object having two generally orthogonal dimensions in a common work plane comprising
   two positioning arms pivoted about generally parallel axes spaced from each other in a direction corresponding to the first of said dimensions and extending generally along the second of said dimensions,
   lever-like elements supporting each of said axes and means for pivoting the lever-like elements about separate axes, each of which is associated with and generally parallel to one of the axes of said positioning arms whereby the object is transported on the arms below the work plane while being turned to present successive surfaces in the work plane for work to be performed thereon.

2. Apparatus according to claim 1 in which each of said positioning arms has means on the end thereof engageable with the opposite edges of said object providing a movable jaw for clamping said object in the horizontal position when said lever-like elements are pivoted outwardly about said separate axes.

3. Apparatus according to claim 2 in which the object is to be transported from a horizontal to a vertical position and one of said positioning arms is pivoted downwardly on said parallel axis extending longitudinally of the object and at the same time rotated rearwardly about said separate axes on said lever-like elements while the object remains supported on said other arm and is turned about said other parallel axes from the horizontal to vertical position.

4. An apparatus according to claim 3 wherein the object is clamped in the vertical position by engaging the opposite flat surfaces thereof with each of said positioning arms and supporting said object from said means at the end of each of said arms.

5. Apparatus according to claim 4 wherein the object is overturned and moved from the vertical to the horizontal position by manipulating said lever-like elements to tilt the object past the center of gravity in the vertical position and onto said other positioning arm, which latter arm supports the object during its returning movement to the horizontal position.

6. A slab turner for manipulating heavy metal slabs through a plurality of work stations in which the slab is turned through 90°, clamped, released, and turned again through successive 90° stations until all four sides are presented for work comprising;
   means defining spaced apart axes positioned in approximately a horizontal plane;
   first and second pairs of supporting and clamping arms, the first pair of arms being pivotably supported on one of said axes and the second pair of arms being pivotably supported on the other said axes, said pairs of arms being in an intermeshed relationship with each other;

means to pivot said pairs of arms about said axes through an arc of at least about 90° in the space between said axes from an approximate horizontal orientation to an approximate downwardly extending vertical orientation;

first and second upstanding lever means supporting said axes, said lever means being connected at ends remote from said axes about spaced apart points; and means to actuate said lever means so that said axes travel in arcuate paths towards and away from each other.

7. A slab turner comprising:

first and second non-connected slab positioning supporting and clamping arm means each including a pivot end and a free end;

slab gripping means at said free ends;

means defining spaced apart horizontal parallel axes, said axes lying in substantially the same horizontal plane;

means to pivot the first arm means at its pivot end about one of said axes and other arm means at its pivot end about the other of said axes both in the space between said axes;

upstanding lever means supporting said axes; and actuating means to move said axes on said lever means towards and away from each other, said actuating means being adapted to move said axes towards each other to the extent that the arm means are in overlapping relationship and the arm gripping means are on opposite sides of the slab being turned.

8. The slab turner of claim 7 wherein said arm means each comprises at least two spaced apart parallel arms; further including means defining spaced apart lower axes for said lever means spaced from said first-mentioned axes and about which said lever means are pivotable.

References Cited

UNITED STATES PATENTS 3,010,753   11/1961   Russ et al. _____ 294—118

GERALD M. FORLENZA, Primary Examiner

F. E. WERNER, Assistant Examiner